US006992562B2

(12) United States Patent
Fuks et al.

(10) Patent No.: US 6,992,562 B2
(45) Date of Patent: Jan. 31, 2006

(54) BIOMETRIC KEYLESS ENTRY SYSTEM

(75) Inventors: Stephen E. Fuks, Ann Arbor, MI (US); David M. Chi, Birmingham, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 218 days.

(21) Appl. No.: 10/458,497

(22) Filed: Jun. 10, 2003

(65) Prior Publication Data
US 2004/0252013 A1    Dec. 16, 2004

(51) Int. Cl.
G05B 19/00 (2006.01)
G06F 7/00 (2006.01)
G08B 29/00 (2006.01)
H04B 1/00 (2006.01)
H04Q 9/00 (2006.01)

(52) U.S. Cl. .................. 340/5.52; 340/5.53; 340/5.54; 340/5.7; 340/5.71; 340/5.8

(58) Field of Classification Search ............... 340/5.53, 340/5.5, 5.8, 5.6, 5.7, 3.71, 426; 382/124; 235/382.5, 492; 282/124
See application file for complete search history.

(56) References Cited

U.S. PATENT DOCUMENTS

| 5,990,803 | A | * | 11/1999 | Park ........................... 340/5.53 |
| 6,041,410 | A | | 3/2000 | Hsu et al. .................... 713/186 |
| 6,100,811 | A | * | 8/2000 | Hsu et al. .................... 340/5.83 |
| 6,140,939 | A | | 10/2000 | Flick ..................... 340/825.69 |
| 6,353,889 | B1 | | 3/2002 | Hollingshead ............... 713/169 |
| 6,376,930 | B1 | * | 4/2002 | Nagao et al. ............... 307/10.2 |
| 6,484,260 | B1 | | 11/2002 | Scott et al. .................. 713/186 |
| 6,496,107 | B1 | | 12/2002 | Himmelstein | 
| 6,636,144 | B1 | * | 10/2003 | Hirakawa ................... 340/5.53 |
| 6,710,700 | B1 | * | 3/2004 | Tatsukawa et al. ........ 340/5.53 |
| 6,819,219 | B1 | * | 11/2004 | Bolle et al. ................. 340/5.52 |
| 2001/0017615 | A1 | | 8/2001 | Lin et al. |
| 2002/0099945 | A1 | | 7/2002 | McLintock et al. ......... 713/186 |
| 2002/0109580 | A1 | | 8/2002 | Shreve et al. ............... 340/5.61 |
| 2003/0023882 | A1 | | 1/2003 | Udom ......................... 713/202 |

FOREIGN PATENT DOCUMENTS

| DE | 199 03 434 A1 | 8/2001 |
| WO | WO 94/15417 A1 | 7/1994 |
| WO | WO 01/91057 A3 | 11/2001 |

* cited by examiner

Primary Examiner—Michael Horabik
Assistant Examiner—Nam Nguyen
(74) Attorney, Agent, or Firm—Brinks Hofer Gilson & Lione

(57) ABSTRACT

A system and method employ a wireless remote keyless entry device to provide entry to a remote system via the wireless device. The system provides a level of authorization and eliminates a complex integration with the remote system to which entry is sought. The remote keyless entry device preferably includes a biometric sensor for receiving a biometric input value and a database including a list of authorized users. Each authorized user has a biometric value and a set of command options associate therewith, and each command option has a command code associated therewith. The device and method allow for one-way secure communication with the remote system, and also provide added functionality and tracking features.

21 Claims, 2 Drawing Sheets

US 6,992,562 B2

BIOMETRIC KEYLESS ENTRY SYSTEM

FIELD OF THE INVENTION

The present invention relates generally to a wireless communication system, and more particularly relates to a remote keyless entry system providing user identification.

BACKGROUND OF THE INVENTION

Many modern vehicles include remote keyless entry systems which allow users to employ various vehicle commands or functions while spaced some distance away from the vehicle. These functions typically include locking and unlocking of vehicle doors, opening of trunks, or even starting the engine.

Unfortunately, these aforementioned systems do not include any screening or authorization features for utilization of the remote keyless entry system. Accordingly, some keyless entry systems have been proposed which provide a level of authorization to the system. For example, some systems require an input of a key code on a touchpad positioned on a vehicle door, while other systems have suggested the use of biometric sensors which are positioned within the vehicle and required for starting of the vehicle. One drawback of these systems is the fact that the input devices or sensors are intimately tied with the vehicle. In vehicles, sensors can quickly become very hot or colt to the touch. Such in-vehicle sensors are costly to repair or replace if damaged. At the least, some form of two-way communication with the primary system (i.e., vehicle) is required for authorization and utilization of the system.

BRIEF SUMMARY OF THE INVENTION

The present invention provides a wireless remote keyless entry device and a method for providing entry to a system via the wireless device. The system provides a level of authorization and eliminates a complex integration with the primary system to which entry is sought. The remote keyless entry device preferably includes a portable power supply and a biometric sensor for receiving a biometric input value. The device further includes memory and a processor. The memory has a database including a list of authorized users. Each authorized user has a biometric value and a set of command options associate therewith, and each command option has a command code associated therewith. A biometric input value is received via the biometric sensor and identifying the authorized user corresponding to the biometric input value. The processor compares the biometric input value to the biometric values of authorized users and loads the associated command options and command codes. An input device receives a command request from the user and a transmitter sends the command code corresponding to the receiving system.

According to more detailed aspects of the present invention, the wireless entry device and method may include the provision of preset commands corresponding to an authorized user, and most preferably corresponding to a particular combination of authorized user and command option or code. For example, when a particular authorized user requests a command for unlocking a vehicle, additional preset commands may also be transmitted such as adjusting the seat position, temperature controls, or radio commands. The remote keyless entry device and method may also be employed with numerous systems, including cell phone systems, internet systems, finance systems or any electronic system to which a restricted and authorized access is desired. Preferably, the biometric sensor and the input values it receives are fingerprint images, although numerous other biometric values may be employed, such as voice recognition, face recognition, eye recognition, or any combination thereof.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
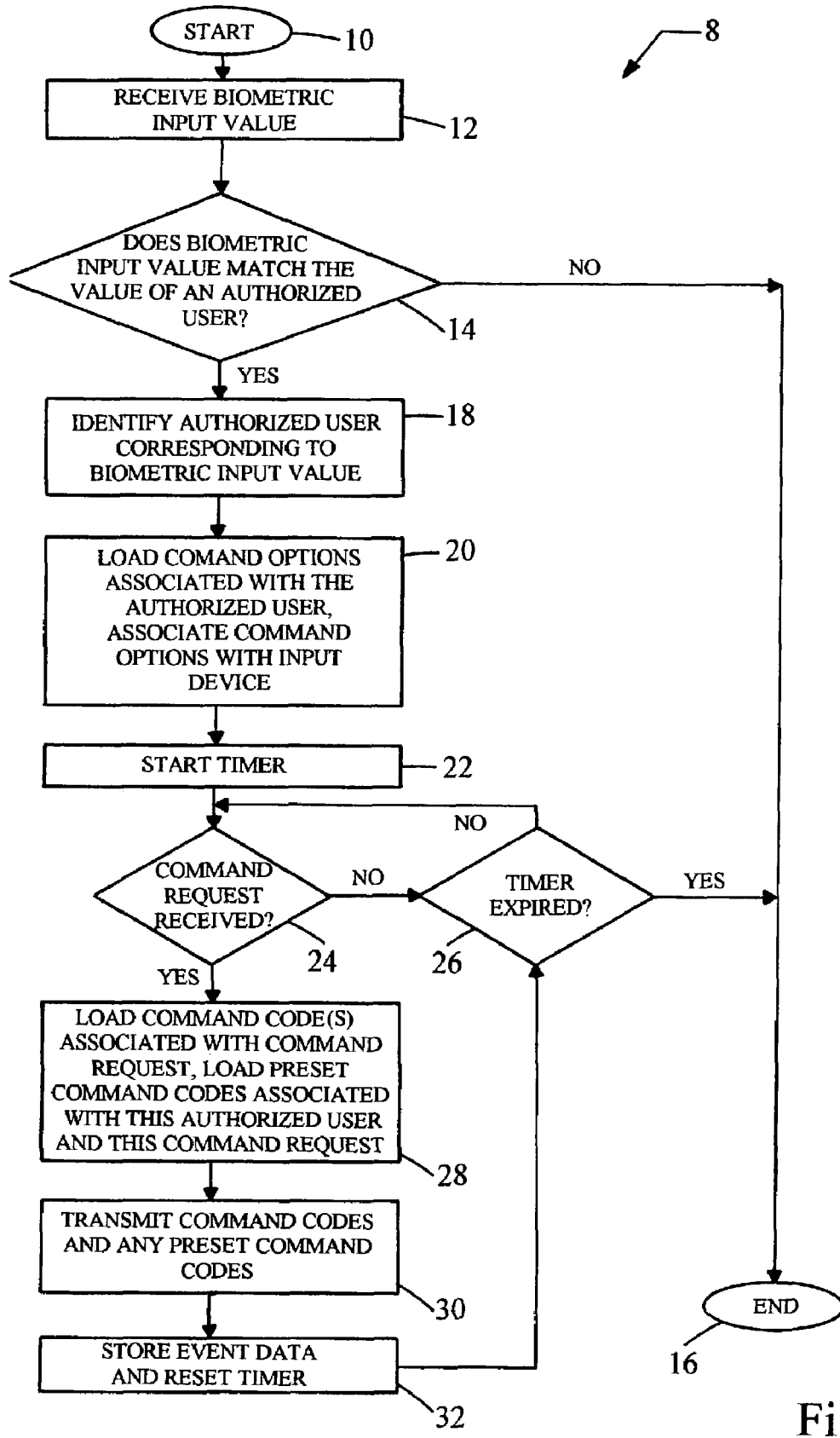
FIG. 1 is a flow chart depicting a method for providing entry to a system via a wireless device constructed in accordance with the teachings of the present invention.
Figure 2:
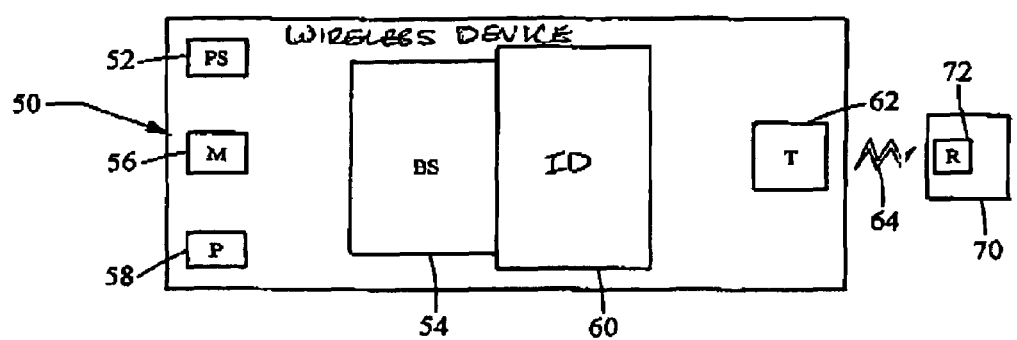
FIG. 2 is a schematic depiction of a wireless device for providing entry to a system.

Turning now to the figures, FIG. 1 depicts a schematic of a method 8 for providing entry to a system 70 (FIG. 2) via a wireless device 50 (FIG. 2). As shown in FIG. 2, the system 70 has a receiver 72 for receiving a wireless signal such as a radio frequency (RF) signal or other well-known signals, including infrared, bluetooth, etc. As used herein, the system 70 generally refers to any electronic system to which access is desired. In a preferred embodiment, the system 70 represents the electronic system of a motor vehicle.

The wireless device 50 shown in FIG. 2 includes a transmitter 62 for sending signals 64 to the receiver 72. These signals 64 correspond to a command request inputted by a user via an input device 60. As shown, the input device 60 is a touch-screen device, although any other human machine interfaces (HMIs) can be used, including pushbuttons or switches. The input device 60 could, also be a microphone for receiving a voice command utilizing voice recognition technology.

The wireless device (preferably a key fob for carrying on one's person) 50 also includes a biometric sensor 54 providing an additional input to the device 50. The biometric sensor 54 is preferably a fingerprint sensor which inputs a fingerprint scan as is known in the art. Alternatively, the biometric sensor 54 may also comprise a light print device, a microphone for voice recognition identification, a camera for face recognition, or a camera for eye or iris scan. Hence, the biometric sensor 54 receives data such as a fingerprint image, voice image, or eye image. Still further, a combination of these and other biometric sensing apparatus may also be imbedded into the device 50. The biometric sensor may also be incorporated into the input device, i.e., the touch screen of the input device 60 may also be employed as the biometric sensor 54. The biometric sensor 54 is positioned such that a user would naturally provide the necessary input to the sensor when holding or operating the device.

The wireless device 50 further includes a portable power supply 52, as well as a memory 56 and processor 58. The power supply 52 is operatively connected to all the electronic components within the device 50, namely the biometric sensor 54, memory 56, processor 58, input device 60 and transmitter 62. Preferably, the memory 56 is a non-volatile type memory which will retain the data stored thereon even if the power supply 52 should be unable to supply power to the memory 56. The memory 56 includes a database having a list of authorized users. Each authorized user can be identified by a user ID, and each authorized user has a biometric value associated therewith. Accordingly, the wireless device 50 can be programmed to store the unique identifier, i.e., the biometric value, of a number of authorized users on the memory 56. Each authorized user also has a set of command options associated with their user ID i.e., commands for vehicles or other systems. Other systems include communication systems such as cell phone or other wireless communication systems, internet or world wide web systems, or finance systems such as credit card or debit card charge authorizations, money transfers, or the like.

Each authorized user may also have a number of pre-set commands stored on the database in memory 56. The preset commands can be linked directly to a specific authorized user, or may be linked to a specific combination of authorized user and command request. For example, upon a specific user initiating an unlock door request to a vehicle, additional preset commands may also be employed such as adjusting seat position to a predetermined position, adjusting climate control to a predetermined setting, adjusting the audio system to a certain level or specific radio station or specific compact disc. Safety systems may also be adjusted to accommodate specific users (i.e., 5th or 95th percentile persons) as well as other vehicle or ride characteristics that can be automatically set to comply with specific user preferences or requirements.

A unique process 8 for providing entry to the system 70 via the wireless device 50 is described in FIG. 2. The method 8 starts at block 10 receives a biometric input value via the biometric sensor 54, as indicated at block 12. A decision is then made as to whether the biometric input value matches the biometric value of an authorized user, as indicated at block 14. As previously noted, the biometric values are pre-programmed into memory 56.

If there is no match of the biometric values, the method 8 flows to its end as indicated at block 16. However, if there is an appropriate match, the authorized user is identified within the database stored on memory 56, as indicated at block 18.

Upon identifying the authorized user, the processor 58 loads the command options associated with the authorized user. The processor 58 also associates those command options with the input device 60, as indicated at block 20. For example, if the input device 60 comprises a series of buttons, each button can be linked to specific command options. When the input device 60 is a touch screen, the command options may simply be displayed on the screen. Finally, if the input device 60 comprises voice recognition technology employed through a microphone, the command options can be associated with certain voice image values.

The method 8 then initiates the timer 22 and waits for a command request as indicated by blocks 22 and 24. If a command has not been received, the method checks to see whether the timer has expired as indicated at block 26. If the timer has expired the wireless device 50 shuts down and the method flows to its end as indicated at block 16. Once at the end, the method 8 must reinitialize and a biometric input value must be entered which matches the value of an authorized user.

Upon receiving a command request via the input device 60, the method then performs several tasks as indicated at block 28. Specifically, the processor 58 loads the command codes associated with the command request, and also loads preset command codes associated with the authorized user and the command request. As previously discussed, certain preset commands may be employed when a specific user has inputted a specific command request. The various command options, as well as the preset commands, are associated with a command code that is recognizable by the system 70. That is, the command codes are typically encoded or encrypted signals such that the security of the system 70 is maintained.

With the command codes and the preset command codes loaded, the codes are transmitted via the transmitter 62 and received by the receiver 72 on the system 70. At this point in the process 8, the event data (i.e., the user ID, the command codes and/or preset command codes transmitted, the time, the date, and any other desired information) are stored on the memory 56. In the event the memory 56 fills up with data, the oldest events will be automatically removed. As also indicated at block 32, the timer has been reset and the method flows back through block 26 to block 24 where the system 8 is ready to receive a command request. In the event no further commands are desired, the method will flow to its end at block 16 upon expiration of the timer.

By allowing the memory 56 to have a database storing different command codes, the wireless device 50 may be employed with multiple systems, as well as multiple vehicles. The present invention thus eliminates dedicated keyless entry systems. The system 8 also facilitates automatic enabling of user preferences and requirements such as driver's seat position, driver's safety system performance as well as climate control and audio control options. Further, system access or specific access can be limited for each desired user. Similarly, the monitoring of events also allows individual users to be watched and recorded. Thus, access to vehicles, digital assistants, or cell phones can be restricted and tracked by user.

The present invention also provides a wireless device 50 that includes all the necessary authorization and encoding features allowing for simple one-way communication within the desired system 70. Unlike in-vehicle ID systems, remote ID allows the driver's seat position to be adjusted before the user enters the vehicle. Safety system performance can also be adjusted or tuned to meet the needs of a particular user. Uniquely, multiple users can use each wireless device 50, and each wireless device can be used with multiple systems or multiple vehicles.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for providing entry to a system via a wireless device, the system having a receiver, the wireless device having a power supply, a processor, memory, a biometric sensor, an input device, and a transmitter, the method comprising the steps of:

providing a database on the memory, the database including a list of authorized users, each authorized user having a biometric value and a set of command options associated therewith, each command option having a command code associated therewith;
receiving a biometric input value via the biometric sensor;
identifying the authorized user corresponding to the biometric input value;
loading the command options corresponding to the authorized user;
receiving a request for one of the command options via the input device; and
transmitting the command code associated with the requested command option to the receiver.

2. The method of claim 1, further comprising the step of loading preset commands corresponding to the authorized user.

3. The method of claim 2, wherein the preset commands are stored on the database.

4. The method of claim 2, wherein the preset commands include vehicle seat adjustment commands.

5. The method of claim 4, wherein the preset commands include moving the seat to a predetermined position.

6. The method of claim 2, wherein the preset commands include at least one of mirror adjustment commands, climate control commands, or radio commands.

7. The method of claim 2, further comprising the step of transmitting command codes associated with the preset commands.

8. The method of claim 7, wherein the command codes associated with the preset commands are transmitted upon identifying the authorized user.

9. The method of claim 7, wherein the command codes associated with the preset commands are transmitted upon identifying a specific combination of authorized user and command request.

10. The method of claim 1, wherein the command options include cell phone commands.

11. The method of claim 1, wherein the command options include internet commands.

12. The method of claim 1, wherein the command options include finance commands.

13. The method of claim 1, wherein the command options include vehicle commands.

14. The method of claim 13, wherein the command options include multiple sets of vehicle commands for multiple vehicles.

15. The method of claim 1, wherein the biometric input value is a fingerprint image.

16. The method of claim 1, wherein the biometric input value is a voice image.

17. The method of claim 1, wherein the biometric input value is an eye image.

18. A wireless remote keyless entry device for a user, the device comprising:
a portable power supply;
a biometric sensor for receiving a biometric input value;
memory having a database stored thereon, the database including a list of authorized users, each authorized user having a biometric value, a set of command options, and a set of preset commands associated therewith, each command option and each preset command having a command code associated therewith;
a processor for comparing the biometric input value to the biometric values of authorized users and loading the associated command options, preset commands and command codes;
an input device for receiving a command request from the user; and
a transmitter for sending the command code corresponding to the command request and preset commands.

19. The wireless remote keyless entry device of claim 18, wherein the input device is a touch screen.

20. The wireless remote keyless entry device of claim 19, wherein the command options corresponding to the authorized user are displayed on the touch screen.

21. The wireless remote keyless entry device of claim 19, wherein the biometric sensor is also the same touch screen forming the input device.

* * * * *